2,723,184
RECOVERY OF HYDROCYANIC ACID

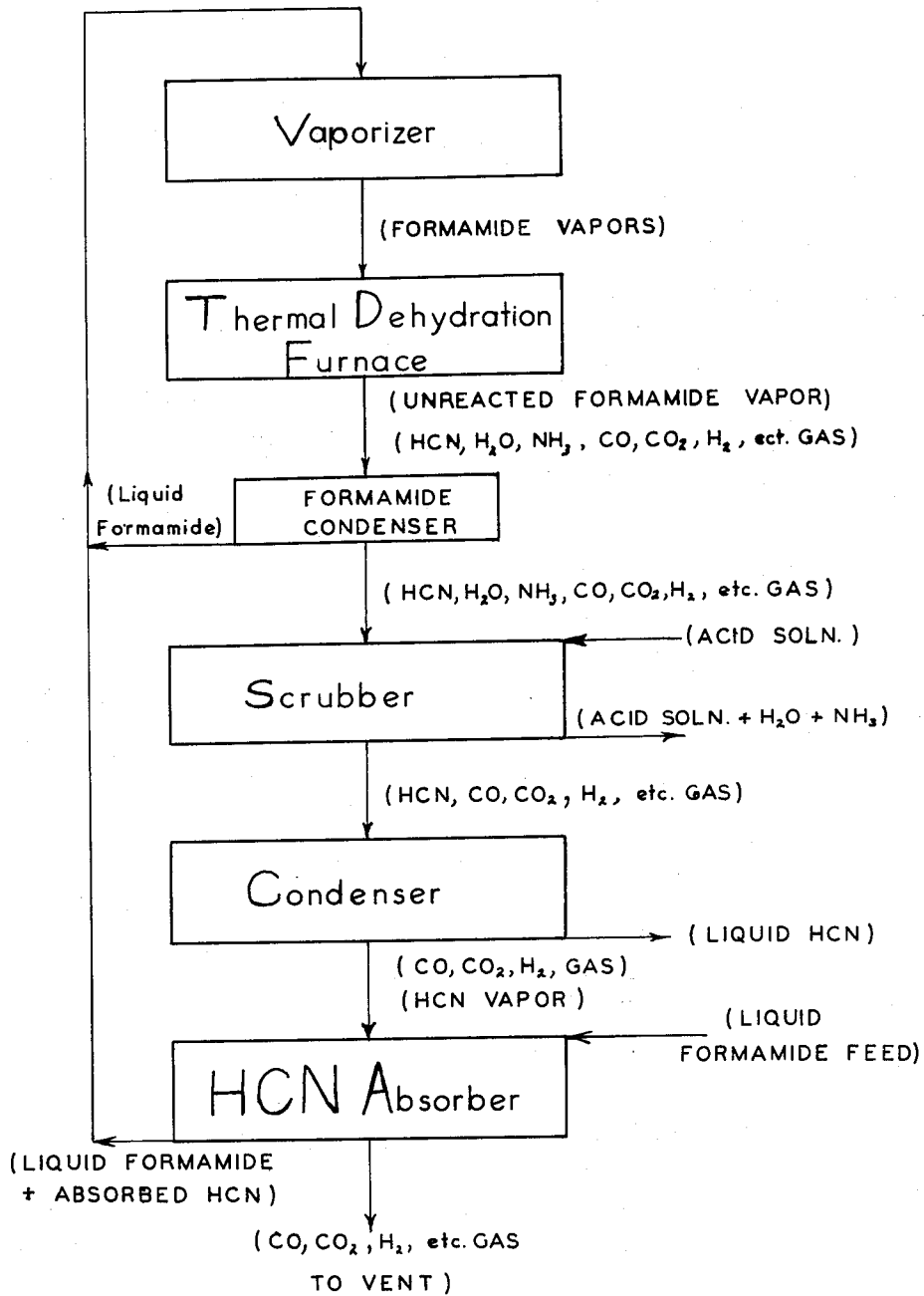

Robert H. J. Creighton, Shawinigan Falls, Quebec, Canada, assignor to Shawinigan Chemicals Limited, Montreal, Quebec, Canada, a corporation of Canada Application December 24, 1952, Serial No. 327,844

2 Claims. (Cl. 23—151)

This invention relates to the preparation of hydrocyanid acid (HCN) and particularly to the substantially complete recovery of HCN prepared by the thermal dehydration of formamide.

The thermal decomposition of formamide to HCN and water proceeds according to the simple equation $$HCONH_2 \rightarrow H_2O + HCN$$

This endothermic reaction, which can be promoted by numerous catalysts and reaction conditions, is, however, invariably accompanied by an alternative decomposition of some of the formamide into carbon monoxide and ammonia. Other side reactions also occur, giving rise to other unwanted gaseous products. Thus, even under the most favorable reaction conditions for the preparation of HCN from formamide, byproduct gases are produced during reaction and must be disposed of.

It is the usual practice to remove the by-product ammonia, from products of the foregoing thermal decomposition, as soon as possible after reaction, since it causes polymerization of the HCN and in other ways adversely affects the desired product of reaction. Removal is usually adequately and efficiently achieved by scrubbing the reaction products with acid solution, which substantially completely absorbs and neutralizes the ammonia.

Water is usually removed from the reaction gases by scrubbing it out together with the HCN, or condensing it out together with the HCN, or separately from the HCN by fractional condensation. When the water and HCN have been removed from the reaction gases, the residual gaseous materials are by-product gases, mostly $H_2$, $CO_2$, and CO, and must be disposed of, usually by eventually discharging them to the atmosphere.

If the HCN is to be utilized as, or eventually converted to, cyanide salts, e. g. sodium cyanide, it can be conveniently and efficiently absorbed from the reaction gases with alkali solutions, e. g. aqueous caustic soda, which remove both water and HCN anud leave the by-product gases substantially free from HCN. Such procedure, however, is not satisfactory when it is desired to recover and use the HCN as a pure product and not as a salt or derivative. In these cases where pure HCN is the required product, it has sometimes been the practice to absorb the HCN from the reaction gases with large volumes of water, forming dilute (2–3%) solutions of HCN, and leaving the unabsorbed by-product gases to be vented to the atmosphere. This procedure requires a great deal of subsequent fractional distillation to concentrate the HCN to a pure product. For this reason, the process is often economically not feasible.

Fractional condensation has been mentioned above as a method of recovering the HCN from the reaction gases. This procedure is the most direct method of obtaining pure HCN, the steps of the process normally involving removing ammonia from the reaction gases by cooling and scrubbing them with an acid solution, i. e., cooling the reaction gases to a temperature above the boiling point of HCN but below the boiling point of water, to condense and remove the water and absorb the ammonia formed in the reaction, then cooling the remaining gases to a temperature below the boiling point of HCN to condense and remove the HCN from the by-product gases as a liquid. Since this is a direct method for recovering the HCN, it would appear to be the most satisfactory one in practically all respects, including economic considerations. The outstanding defect of the process is the impracticability of condensing all the HCN from the reaction gases.

HCN has a vapor pressure of about 110 millimeters at its freezing point (about −15° C.), and consequently any process of condensing liquid HCN from the reaction gases will produce, at best, residual gases containing HCN vapors at a partial pressure of at least 110 mm. Since, as pointed out above, there is bound to be an appreciable amount of byproduct gas produced, the loss of HCN beyond the HCN condensation step can be considerable.

Although this loss has heretofore been tempered by recovery of the HCN as cyanide salts, there has none-the-less been a loss of HCN production when HCN is the desired product. This recovery has been achieved only by scrubbing the byproduct gases with aqueous alkali solutions, which formed cyanide salts and carbonate salts with the HCN and $CO_2$ in the gases. For the recovery of cyanide salts by this method, much alkali is wasted in the formation of carbonate salts. It is the object of this invention to recover HCN from these byproduct gases directly, as pure HCN, without the loss of HCN as cyanide salts and without the consumption of large amounts of alkali.

It has been discovered that HCN can be absorbed from the by-product gases with liquid formamide, and that the formamide containing dissolved HCN is not adversely affected for use in production of HCN by thermal dehydration, and hence can be utilized directly as raw material for thermal dehydration to HCN after being used to scrub the by-product gases of prior thermal dehydration. The invention thus comprises, in a process for the production of hydrocyanic acid by the thermal dehydration of formamide wherein the hydrocyanic acid is condensed and removed from the other reaction products as liquid hydrocyanic acid, the step of absorbing hydrocyanic acid vapors from the by-product gases with liquid formamide. The invention also comprises the additional step of returning the liquid formamide containing hydrocyanic acid absorbed from the by-product gases to a thermal dehydration process for the production of hydrocyanic acid.

The accompanying drawing is a diagrammatic flowsheet outlining the sequence of the steps of a typical process in which this invention is utilized. Initially this typical process is started with ordinary formamide being fed to a vaporizer, from which formamide vapors pass into a thermal dehydration furnace. In the furnace the formamide vapors are decomposed, mostly into HCN and $H_2O$, but also, in part into CO and $NH_3$. Some decomposition of formamide to CO and $NH_3$ also occurs in the vaporizer, as is well known in the art. The selection of conditions most suitable for the formation of HCN in the furnace is likewise well known in the art. Despite the most favorable conditions for the formation of HCN, side reactions also occur, chiefly in the furnace, and gases such as carbon dioxide, hydrogen and nitrogen are produced. All the products of reaction are cooled to condense unreacted formamide, then further cooled by scrubbing with an acid solution, e. g. a 1–40% aqueous sulfuric acid solution, which absorbs the ammonia and condenses and removes most of the water. A small condenser, not shown on the flowsheet, can be used to condense the remainder of the water vapor, if any; the remaining reaction gases are passed to a low temperature condenser where most of the HCN vapors are condensed and removed as liquid HCN, while the by-product gases pass through the condenser. The by-product gases leaving this condenser carry with them, at atmospheric pressure, HCN vapors in an amount of at least about one-seventh of their volume (usually above 15% by volume), since the vapor pressure of liquid HCN is at least 110 mm. In accordance with this invention, these gases are then passed through an absorber where they are contacted with liquid formamide, which absorbs the HCN vapors and leaves the by-product gases with a residual HCN content of as low as 0.5–1.5%. Of the total HCN produced, less than 0.5% and usually less than 0.3% remains in the by-product gases after absorption with fresh formamide. The by-product gases are vented to the atmosphere. In accordance with a further feature of this invention, the liquid formamide containing absorbed HCN is passed to the first step of the process, where it and the dissolved HCN are vaporized and conducted through the remainder of the process as outlined above until HCN is again condensed from the reaction products, and residual HCN vapors absorbed from the by-product gases with fresh formamide.

Processes using variations in the sequence of, or modifications of, the steps as outlined above, may also utilize the novel step of this invention. For example, the reaction gases can be cooled immediately after the initial reaction, to condense out the water, and the ammonia subsequently absorbed by scrubbing the remaining gases with acid. The absorption of HCN vapors with formamide following condensation of most of the HCN as liquid is independent of the details or sequence of the steps of producing the HCN by the thermal dehydration of formamide.

Modifications and variations in the method of absorbing the HCN vapors from by-product gases with liquid formamide can be made. Such modifications are made to take advantage of the most efficient and/or most economical means of absorbing the HCN vapors in liquid formamide. For example, it has been found highly efficient to pass the gases for absorption through two absorbing towers in series, countercurrently to a flow of liquid formamide. In the first of such towers, liquid formamide is circulated continuously at a rate sufficient to provide good contact thereof with the HCN vapors to be absorbed, and a proportion of the circulating liquid is withdrawn continuously as feed to a dehydration furnace for the production of HCN. In the second of the towers, the gases flow counter-currently to a continuous stream of fresh formamide which passes only once through the tower, then flows to the first tower where it becomes part of the circulating liquid and maintains the amount of the latter constant, making up for the proportion that is continuously being withdrawn for the production of HCN.

*Example*

As a specific example of the efficiency of the process, it was found that, in a formamide dehydration process as represented in the flow sheet and briefly described in conjunction therewith, with a two-tower absorbing system as described above, the proportion of HCN in the vented gas was held to from 1.4% down to 0.7% by volume in a series of eight runs in contrast to losses of the order of 15% by volume which would have occurred in the absence of the formamide scrubbing system; the yield loss represented by these proportions of HCN actually lost in the vented gases varied between 0.46% and 0.14% based on the formamide consumed. The amounts of formamide being fed to the second absorbing tower, circulated through the first tower, and subsequently fed to the furnace for dehydration to HCN, varied from 298 to 587 parts by weight per hour, while the liquid within the first absorbing tower was circulated at a uniform rate of 1350 parts by weight per hour. The amounts of HCN absorbed in the liquid formamide which flowed through the second absorbing tower and circulated in the first absorbing tower varied between 2.3% and 4.1% by weight of the formamide fed to the furnace from the first tower.

It will be understood that without departing from the spirit of the invention or the scope of the claims, various other modifications may be made in the specific expedients described. The latter are illustrative only and not offered in a restricting sense, it being desired that only such limitations shall be placed thereon as may be required by the state of the prior art.

What is claimed is:

1. In a process for the production of hydrocyanic acid by the thermal dehydration of formamide, wherein the hydrocyanic acid is condensed and removed from the other reaction products as liquid hydrocyanic acid, the steps of absorbing hydrocyanic acid vapors from the by-product gases with liquid formamide and returning the formamide containing hydrocyanic acid absorbed from the by-product gases to the thermal dehydration process for the production of hydrocyanic acid.

2. The steps in a process, as claimed in claim 1, in which the hydrocyanic acid vapors are absorbed from the by-product gases by passage thereof through a series of absorbing towers counter-currently to a flow of the liquid formamide which is subsequently used for the production of hydrocyanic acid.

References Cited in the file of this patent

UNITED STATES PATENTS

| | | |
|---|---|---|
| 2,529,546 | Fallows et al. | Nov. 14, 1950 |
| 2,604,380 | Beekhuis | July 22, 1952 |
| 2,634,825 | Drake et al. | Apr. 14, 1953 |